US010710730B2

(12) United States Patent
Zug

(10) Patent No.: US 10,710,730 B2
(45) Date of Patent: Jul. 14, 2020

(54) PASSIVE OBOGS TEMPERATURE SUPPLY USING CONDITIONED AVIONICS COOLING

(71) Applicant: HONEYWELL INTERNATIONAL INC., Morris Plains, NJ (US)

(72) Inventor: Andrew Zug, Costa Mesa, CA (US)

(73) Assignee: Honeywell International Inc., Morris Plains, NJ (US)

( * ) Notice: Subject to any disclaimer, the term of this patent is extended or adjusted under 35 U.S.C. 154(b) by 612 days.

(21) Appl. No.: 15/099,150

(22) Filed: Apr. 14, 2016

(65) Prior Publication Data

US 2016/0304209 A1    Oct. 20, 2016

Related U.S. Application Data

(60) Provisional application No. 62/147,982, filed on Apr. 15, 2015.

(51) Int. Cl.
| | |
|---|---|
| *B64D 13/08* | (2006.01) |
| *A62B 7/14* | (2006.01) |
| *A62B 9/00* | (2006.01) |
| *B64D 13/06* | (2006.01) |

(52) U.S. Cl.
CPC ............. *B64D 13/08* (2013.01); *A62B 7/14* (2013.01); *A62B 9/003* (2013.01); *B64D 2013/0614* (2013.01); *B64D 2013/0674* (2013.01); *B64D 2013/0677* (2013.01)

(58) Field of Classification Search
CPC ....... A62B 7/14; B64D 13/08; B64D 13/0677
See application file for complete search history.

(56) References Cited

U.S. PATENT DOCUMENTS

| | | | |
|---|---|---|---|
| 6,729,359 B2 | 5/2004 | Jones | |
| 7,845,188 B2 | 12/2010 | Brutscher et al. | |
| 2003/0233936 A1* | 12/2003 | Crome | A62B 7/14 |
| | | | 95/96 |
| 2004/0000353 A1* | 1/2004 | Jones | B64D 13/08 |
| | | | 141/64 |
| 2005/0235659 A1* | 10/2005 | Brutscher | B64D 37/32 |
| | | | 62/93 |
| 2008/0110603 A1* | 5/2008 | Fellague | B64D 13/00 |
| | | | 165/140 |
| 2011/0168372 A1* | 7/2011 | Takahashi | F28D 1/0443 |
| | | | 165/173 |
| 2012/0175080 A1 | 7/2012 | Muehthaler et al. | |
| 2013/0277015 A1 | 10/2013 | Scholl et al. | |
| 2016/0096629 A1* | 4/2016 | Vaisman | F25B 41/00 |
| | | | 62/115 |

* cited by examiner

*Primary Examiner* — Elizabeth J Martin
*Assistant Examiner* — Nael N Babaa
(74) *Attorney, Agent, or Firm* — Shumaker & Sieffert, P.A.

(57) ABSTRACT

In some examples, a temperature control system comprises a heat exchanger providing thermal communication between inlet air and an avionics temperature controlled fluid, for controlling the temperature of the inlet air for use in an onboard oxygen generating system (OBOGS). The inlet air that exits the heat exchanger can be used as supply air for the OBOGS.

16 Claims, 3 Drawing Sheets

PASSIVE OBOGS TEMPERATURE SUPPLY USING CONDITIONED AVIONICS COOLING

CROSS-REFERENCE TO RELATED APPLICATION(S)

The present application is related to and claims priority from Provisional Application Ser. No. 62/147,982 filed Apr. 15, 2015, the contents of all of which are incorporated herein by this reference.

BACKGROUND OF THE INVENTION

The present invention relates to On-Board Oxygen Generating Systems (OBOGS) and, more particularly, to a system for providing temperature controlled supply air for OBOGS.

An On-Board Oxygen Generating System (OBOGS), typically used by military aircraft, allows an aircraft to generate its own oxygenated air during flight. The product air from the OBOGS may be channeled through a regulator for use as breathing air by pilots, and/or other persons onboard the aircraft, or may be stored in a tank for later use (i.e. emergency or back up oxygen requirements). The inlet air to be treated by the OBOGS typically comprises conditioned engine bleed air. The treatment or conditioning of the bleed air entering the OBOGS typically requires adjusting the temperature of the bleed air in order to bring it to an acceptable temperature for the OBOGS.

Conventional approaches for temperature control of the bleed air may include overcooling the bleed air, and subsequently heating the overcooled air through a heat exchanger, which may be warmed by hot air. Such active temperature control may typically be performed at a location remote from the OBOGS, for example, near an engine of the aircraft. As the OBOGS may typically be located near the aircraft cockpit, the air may travel through a long, uncontrolled heat path before reaching the OBOGS, and may subsequently lose or gain heat as it is conveyed to the OBOGS. In typical operations where air-flow may be particularly low (i.e. 2-3 pounds/min or 0.015-0.022 kg/s) such long path to the OBOGS may have an especially significant effect in failure to maintain the set temperature.

As can be seen, there is a need for an improved system for providing temperature controlled supply air for OBOGS that provides controlled, efficient, and cost effective temperature control of the supply air. A system is needed that reduces or eliminates the need for active control and reduces or eliminates temperature fluctuations due to uncontrollable environmental conditions.

SUMMARY OF THE INVENTION

In one aspect of the present invention, a temperature control system comprises a pre-cooled temperature controlled fluid; an onboard oxygen generating system (OBOGS); a heat exchanger configured to provide heat exchange between an inlet air and the temperature controlled fluid, wherein the system brings a temperature of the inlet air to an OBOGS operable temperature range.

In another aspect of the present invention, a temperature control system comprises a heat exchanger configured to provide heat exchange between an inlet air and a temperature controlled fluid, wherein the inlet air exits the heat exchanger as supply air for an onboard oxygen generating system (OBOGS), and wherein a temperature range of the temperature controlled fluid overlaps with an OBOGS operable temperature range.

In another aspect of the present invention, a temperature control system comprises a temperature controlled avionics supply; a heat exchanger directly downstream of the avionics supply; an onboard oxygen generating system (OBOGS) downstream of the heat exchanger; wherein a difference in a temperature of fluid exiting the avionics supply and a temperature of a fluid entering the heat exchanger, renders absent the need for an active temperature control to the fluid exiting the heat exchanger and flowing towards the OBOGS.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims. However, any single inventive feature may not address any of the problems discussed above or may only address one of the problems discussed above. Further, one or more of the problems discussed above may not be fully addressed by any of the features described below.

Various inventive features are described below that can each be used independently of one another or in combination with other features.

Broadly, the present invention provides an environmental control system (temperature control system) for passive temperature control of air used by an onboard oxygen generating system (OBOGS), which may, for example, be used in vehicles such as aircraft. The present system may include a heat exchanger configured to exchange heat between external air and a temperature-controlled cooling supply. According to various embodiments, the heat exchanger can be located near the OBOGS. This can avoid the cost and complexity associated with added valves and control loops required by active temperature control, and may further avoid a long travel path that may impede temperature control efforts.

Figure 1:
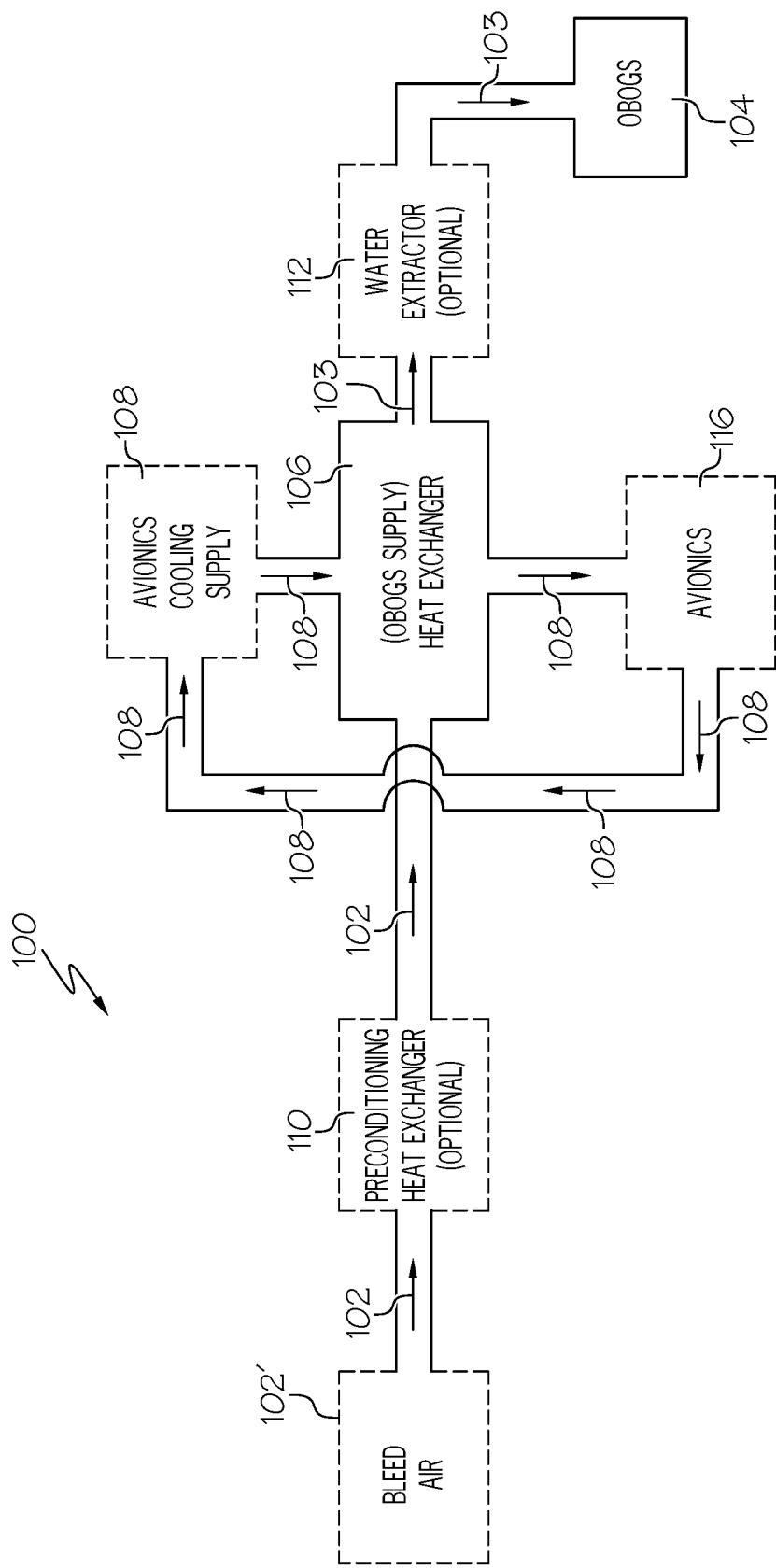
FIG. 1 is a schematic view of a temperature control system in accordance with an embodiment of the present invention.

In accordance with various embodiments, FIG. 1 illustrates a schematic of a temperature control system 100 ("Environmental Control System") to adjust the temperature of an outside or inlet air 102 (such as aircraft bleed air) to be used as a supply air 103 to an onboard oxygen generating system (OBOGS) 104 of, for example, an aircraft. The OBOGS 14 may be of conventional design.

According to various embodiments, the temperature control system 100 may include a heat exchanger 106 ("OBOGS supply heat exchanger") that may be of conventional design and provides heat exchange between an inlet air 102 and a temperature controlled fluid 108, which may be a pre-cooled temperature controlled fluid, such as a cooled supply fluid for eventual cooling of avionics 116 ("avionics cooling supply" or "avionics supply fluid"). In various embodiments, the heat exchanger 106 may be upstream of and/or proximate to the OBOGS 104 such that a temperature modulation caused by conveyance of the supply air 103 from the heat exchanger 106 to the OBOGS 104 is negligible.

In various embodiments, the temperature control system 100 may further include a pre-conditioning heat exchanger 110 intermediate the inlet air source 102 and the heat exchanger 106. The pre-conditioning heat exchanger 110 can be of conventional design and may provide heat exchange between the inlet air 102 and a pre-conditioned cooling source.

In embodiments, the system 100 may further include a water extractor 112 intermediate the heat exchanger 106 and the OBOGS 104. The water extractor may be of convention design.

As shown in FIG. 1, and in accordance with various embodiments, the inlet air 102, which may comprise engine bleed air, enters and is conveyed through the heat exchanger 106, then exits the heat exchanger 106 as supply air 103 for the OBOGS 104. The temperature controlled fluid 108, or avionics cooling supply, is also conveyed through the heat exchanger 106, and exits the heat exchanger 106 to cool various electronic systems, (referred to as avionics 116) of the aircraft 105.

As shown in FIG. 1, prior to entering the heat exchanger 106, the inlet air 102 may flow through the pre-conditioning heat exchanger 110 located upstream of the heat exchanger 106, and supply air 103 exiting the heat exchanger 106 may flow through the optional water extractor 112, according to various embodiments.

In various embodiments, heat exchange between the inlet air 102 and the temperature controlled fluid 108, via the heat exchanger 106, can be sufficient to bring the temperature of the inlet air 102 to within a temperature range required for supply air 103 to the OBOGS 104 (i.e., an OBOGS operable temperature range). In various embodiments, the temperature of the supply air 103 exiting the heat exchanger 106 can be approximately the same temperature or to within about 5° F. (2.8° C.) of the temperature controlled fluid 108. Thus, heat exchange between the inlet air 102 and the temperature controlled fluid 108 renders absent the need for an active temperature control to the fluid or supply air 103 exiting the heat exchanger 106 and flowing towards the OBOGS 104.

In various embodiments, the temperature range of the temperature controlled fluid 108 entering the heat exchanger 106 may overlap with the required temperature range for the supply air 103 (wherein the required temperature range for the supply air is determined by the requirements of the specific OBOGS and/or aircraft). For example, the temperature range of the temperature controlled fluid 108 may fall within the required temperature range for the supply air 103, or visa versa.

In various embodiments, the required temperature range for the supply air 103 to the OBOGS 104 (i.e. OBOGS operable temperature range) may be between about 50° F. (10° C.) and 120° F. (° C.), or between about 50° F. (10° C.) and 110° F. (43° C.), or between about 50° F. (10° C.) and 100° F. (37.8° C.).

In various embodiments, the temperature range for the temperature controlled fluid 108 may be between about 59° F. (15° C.) and 95° F. (35° C.), or between about 60° F. (15.6° C.) and 80° F. (26.7° C.), or at about 60° F. (15.6° C.). In various embodiments, inlet air 102 entering the heat exchanger 106 may be between about 0° F. (−18° C.) and 200° F. (93° C.), or up to about 400° F. (204° C.). Thus, inlet air 102 may be heated or cooled via thermal exchange with the temperature controlled fluid 108.

In various embodiments, a flow rate of the inlet air 102 into the heat exchanger 106 may be from about 1 pounds/min (0.0076 kg/s) to about 4.5 pounds/min (0.034 kg/s), or from about 2 pounds/min (0.015 kg/s) to about 3 pounds/min (0.023 kg/s).

In various embodiments, a flow rate ratio in the heat exchanger 106 between the temperature controlled fluid 108 and inlet air 102 may be at least about 3:1, or from about 3:1 to about 5:1, wherein the temperature controlled fluid 108 is in liquid form and has a temperature range of approximately between 59° F. (15° C.) and 95° F. (35° C.), for effective temperature control of the inlet air 102. For example, inlet air 102 having a flow rate of 3 pounds/min (0.023 kg/s) may require from 5 pounds/min (0.038 kg/s) to 15 pounds/min (0.11 kg/s) of liquid temperature controlled fluid 108 for effective temperature control at the above described temperature range. In embodiments wherein the temperature controlled fluid 108 is in a gaseous form, the ratio between the temperature controlled fluid 108 and inlet air 102 may be from about 9:1 to about 15:1. According to various embodiments, if more temperature controlled fluid 108 is available than is required for conditioning the supply air 103, excess flow may be bypassed around the heat exchanger 106, for example, by means of a passive bypass line. This may advantageously minimize the pressure drop that the heat exchanger may impose on the avionics cooling supply. Such bypass line may be a parallel line that may bypass a roughly fixed fraction of the fluid around the heat exchanger. The bypass fraction may be set, for example, by adjusting the relative restriction of the bypass line, e.g. via an orifice or valve in the line.

Figure 2:
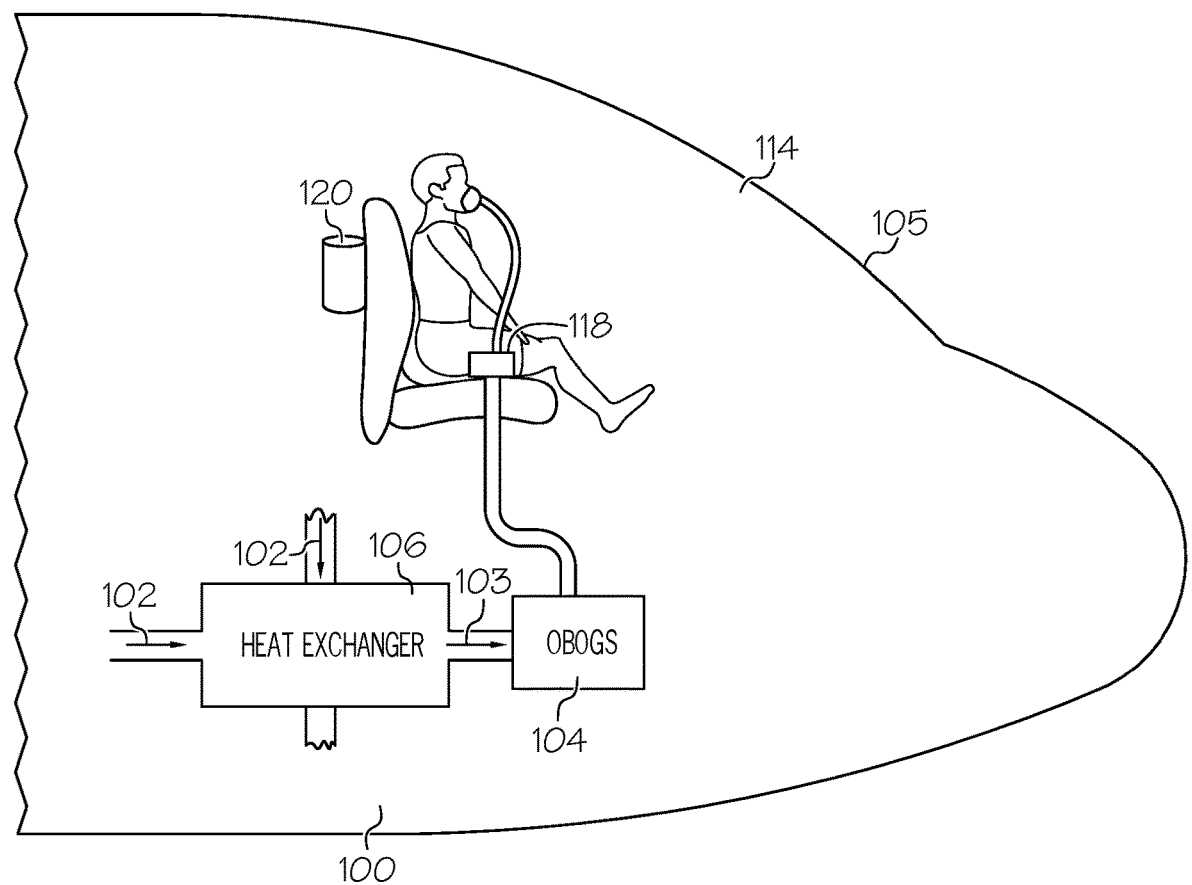
FIG. 2 is a partial view of an aircraft including the temperature control system of FIG. 1 in accordance with an embodiment of the present invention.

As illustrated in FIG. 2, the OBOGS 104 may be located at or near an environment 114 of a user, such as a cockpit 114 of the aircraft 105, for example, an equipment bay outside the cockpit 114. The OBOGS 104 may be used for generating oxygenated or breathing air during flight. Such breathing air may be channeled through a regulator 118 for use as breathing air in the cockpit 114, or may be stored in a tank 120, which may also be located at or near the cockpit 114, as shown in the figure.

In various embodiments, the heat exchanger 106 of the temperature control system 100 may be located proximate the OBOGS 104. Placement of the heat exchanger 106 near the OBOGS 104 is made convenient as the temperature controlled fluid 108 may typically be available also at or near the cockpit 114, proximate the OBOGS, as shown in FIG. 2. The proximity between the heat exchanger 106 and the OBOGS 104 can provide effective maintenance of the adjusted temperature of supply air 103 as it leaves heat exchanger 106 and enters the OBOGS 104, by avoiding a long and thermally uncontrolled travel path for the supply air 103. In various embodiments, a distance between the heat exchanger 106 and OBOGS 104 may be between approximately 5-40 ft (1.2-12 m), depending on the type of aircraft. In various embodiments, the adjusted temperature of supply air 103 leaving the OBOGS 104 may be approximately equal to or within about 5° F. (2.8° C.) of the supply air 103 entering the OBOGS 104.

Avionics Temperature Controlled Fluid

The temperature controlled fluid 108 can be separately controlled and circulated throughout the aircraft 105 for cooling aircraft electrical components of various aircraft systems, referred to as the avionics 116. According to an embodiment, the temperature controlled fluid 108 utilized by the temperature control system 100 may be a liquid coolant, as pressure/volume change due to temperature change is minimal in the liquid form. However, a gaseous form of the fluid 108 may also be utilized according to various embodiments.

In various embodiments, temperature controlled fluid 108 may comprise a dielectric liquid coolant(s) and/or a non-dielectric liquid coolant(s), including synthetic coolants. Suitable coolants may include, but are not limited to synthetic aromatic hydrocarbons, aliphatic hydrocarbons of paraffinic and iso-paraffinic type (including mineral oils), petroleum based aliphatic compounds, such as aliphatic PAO-based fluids, silicones such as dimethyl- and methyl phenyl-poly (siloxane) or silicone oil, ethylene Glycol (EG), ethylene glycol water, propylene Glycol (PG), methanol/water, and ethanol/water. According to various embodiments, temperature controlled fluid 108 may comprise hydrogenated polyalphaolefin-based fluid (PAO), and/or ethylene glycol/water (EGW).

In various embodiments, the temperature controlled fluid 108 may circulate in a closed loop, wherein it may be channeled for cooling the avionics 116, and actively cooled for recirculation. In various embodiments, the temperature controlled fluid 108 may pass through the heat exchanger 106 before cooling the avionics 116.

In various embodiments, the temperature controlled fluid 108 may generally be at a temperature of between about 59° F. (15° C.) and 95° F. (35° C.), or between about 60° F. (15.6° C.) and 80° F. (27° C.), or at about 60° F. (15.6° C.).

Heat Exchanger

Various heat exchange schemes may be utilized. According to an embodiment, the heat exchanger 106 may be a fully buffered heat exchanger, comprising air gaps between adjacent flow channels, in order to prevent liquid fluid (i.e., temperature controlled fluid 108 in liquid form) from leaking into and contaminating the channels carrying the inlet air 102. In various embodiments, the heat exchanger 106 can provide sufficient and efficient heat exchange to bring the temperature of the inlet air 102 to within a few degrees of the temperature controlled fluid 108. For a 2 to 3 pounds/min (0.015 to 0.022 kg/s) flow of inlet air 102 and a temperature controlled fluid comprising PAO (i.e. liquid form), a metal (e.g. aluminum or steel) heat exchanger may include about 10 interleaved passages, and weigh about 5 pounds (2 kg). Such heat exchanger may measure approximately 6 inches (15 cm) or less on each side, according to various embodiments, and may have a heat transfer effectiveness of about 95% and control the temperature of inlet air 102 to within a few degrees of the PAO fluid having a temperature set to about 70° F. (21° C.) upstream of the heat exchanger 106. In embodiments where a gaseous temperature controlled fluid 108 is used, a similar but non-buffered heat exchanger may weigh about 10 pounds (4.5 kg).

Optional Pre-Conditioning Heat Exchanger and Water Extractor

In various embodiments, the pre-conditioning heat exchanger 110 may be located upstream of the heat exchanger 106, for preconditioning bleed air, which may be in the order of 1000° F. (538° C.) in its untreated condition, to bring its temperature down to about 200° F. to about 400° F. (93° C. to 204° C.). Such pre-conditioning heat exchanger 110 may use, for example, outside air or a heat transfer fluid. In various embodiments, a water extractor may be located downstream of the heat exchanger 106 to remove entrained moisture and reduce overall air humidity of the supply air 103 to a humidity level required by the OBOGS.

Figure 3:
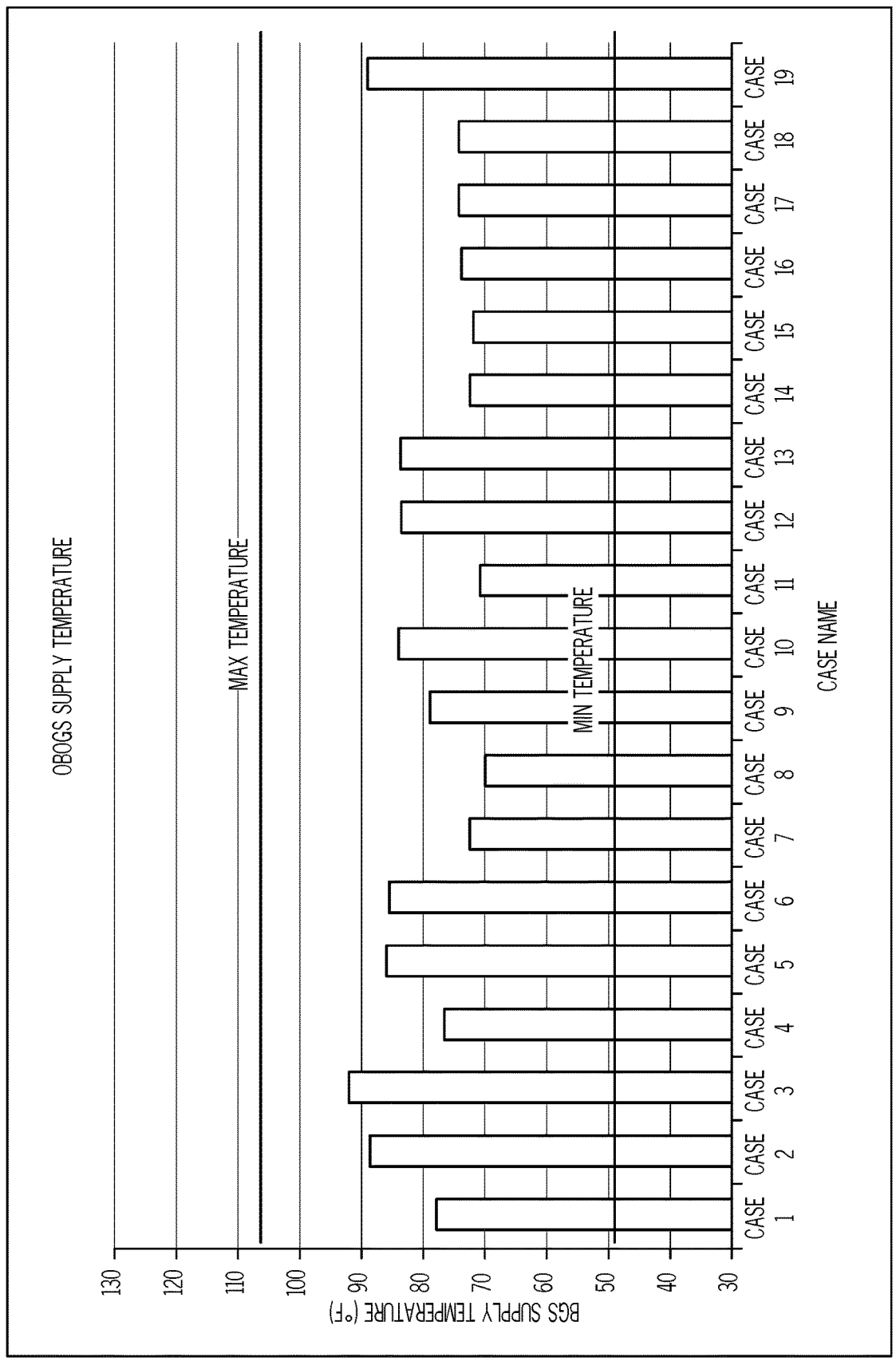
FIG. 3 is a graph showing the resultant temperature of supply air using the temperature control system of FIG. 1.

FIG. 3 is a graph showing exemplary resultant temperatures of supply air, cooled according to the temperature control system 100 via the heat exchanger 106 using temperature controlled fluid 108 comprising PAO fluid. As can be seen, the temperatures for all cases fell between the required operating temperature for the OBOGS, which was between 50 and 110° F. (10 and 43° C.).

Although aircrafts utilizing OBOGS typically include military aircraft, the disclose temperature control system 100 may be utilized by any aircraft having OBOGS, including commercial planes and various other aircrafts.

It should be understood, of course, that the foregoing relates to exemplary embodiments of the invention and that modifications may be made without departing from the spirit and scope of the invention as set forth in the following claims.

I claim:

1. A temperature control system in an aircraft, the temperature control system comprising:
    a primary heat exchanger configured to provide heat exchange between a bleed air from the aircraft and a temperature controlled fluid from avionics in the aircraft to cool the bleed air using the temperature controlled fluid from the avionics,
    wherein the temperature controlled fluid circulates from the avionics, to an avionics cooling supply, to the primary heat exchanger, and back to the avionics,
    wherein the bleed air exits the primary heat exchanger as supply air for an onboard oxygen generating system (OBOGS),
    wherein a temperature range of the temperature controlled fluid overlaps with an OBOGS operable temperature range whereby a temperature difference between a temperature of the bleed air exiting the primary heat exchanger and a temperature of the temperature controlled fluid entering the primary heat exchanger is within a predetermined temperature range, and
    wherein the bleed air flows directly from the primary heat exchanger and into the OBOGS without active temperature control of the bleed air between the primary heat exchanger and the OBOGS.

2. The temperature control system of claim 1, wherein a flow rate ratio in the primary heat exchanger between the temperature controlled fluid and the bleed air is at least 3:1.

3. The temperature control system of claim 1, wherein the temperature controlled fluid is a liquid coolant.

4. The temperature control system of claim 1, wherein the primary heat exchanger comprises a plurality of adjacent flow channels and air gaps between the flow channels, wherein the air gaps are configured to prevent the temperature controlled fluid from contaminating the bleed air due to leaks in the flow channels.

5. The temperature control system of claim 4, wherein a flow rate ratio in the primary heat exchanger between the temperature controlled fluid and the bleed air is at least 3:1.

6. The temperature control system of claim 1, further comprising a pre-conditioning heat exchanger upstream of the primary heat exchanger.

7. The temperature control system of claim 6, wherein the pre-conditioning heat exchanger is configured to reduce the temperature of the bleed air exiting the pre-conditioning heat exchanger to a temperature in a range of 200° F. (93° C.) to 400° F. (204° C.).

8. The temperature control system of claim 1, further comprising a water extractor downstream of the primary heat exchanger.

9. The temperature control system of claim 8, wherein the water extractor is intermediate the primary heat exchanger and the OBOGS.

10. The temperature control system of claim 1, wherein a distance between the primary heat exchanger and the OBOGS is five feet to forty feet (1.5 meters to 12 meters), such that a temperature modulation caused by conveyance of a supply air from the primary heat exchanger to the OBOGS is negligible.

11. The temperature control system of claim 1, wherein the OBOGS operable temperature range is 50° F. (10° C.) to 120° F. (49° C.), and wherein a temperature range of the temperature controlled fluid is 59° F. (15° C.) to 95° F. (35° C.).

12. The temperature control system of claim 1, wherein the temperature controlled fluid exits the primary heat exchanger to cool the avionics of the aircraft.

13. The temperature control system of claim 1, wherein the temperature controlled fluid is circulated in a closed loop throughout the aircraft for cooling the avionics.

14. The temperature control system of claim 1, further comprising:
a passive bypass line configured to carry excess flow around the primary heat exchanger; and
an orifice or a valve configured to adjust a bypass fraction for the primary heat exchanger and the passive bypass line.

15. The temperature control system of claim 1, wherein the primary heat exchanger measures six inches or less on each side.

16. The temperature control system of claim 1, wherein the temperature of the bleed air exiting the primary heat exchanger is within 5° F. (2.8° C.) of the temperature of the temperature controlled fluid.

* * * * *